No. 684,657. Patented Oct. 15, 1901.
F. G. WEBB.
GEARING FOR SELF MOVING VEHICLES.
(Application filed Dec. 7, 1900.)
(No Model.)
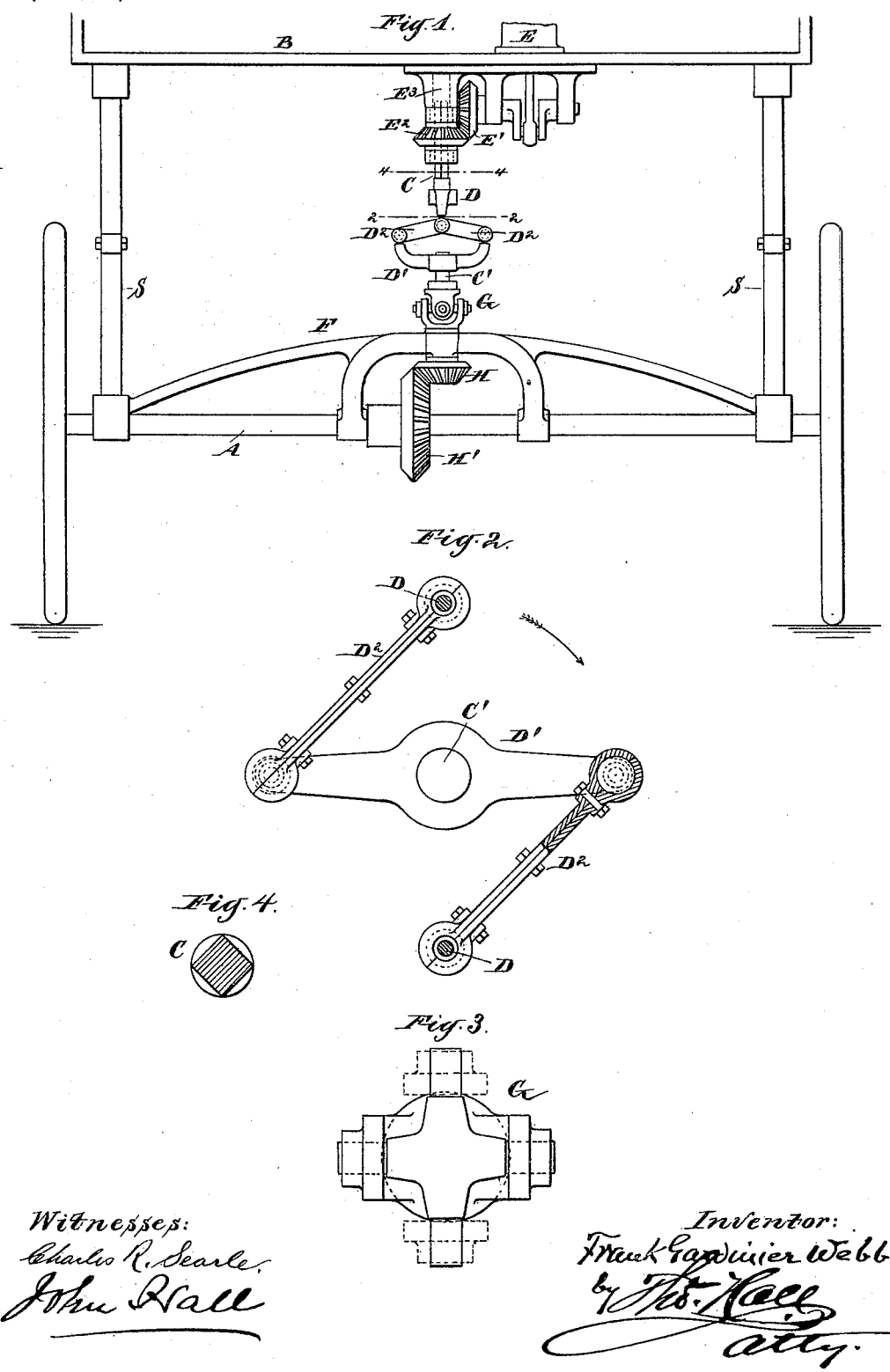

UNITED STATES PATENT OFFICE.

FRANK G. WEBB, OF BROOKLYN, NEW YORK.

GEARING FOR SELF-MOVING VEHICLES.

SPECIFICATION forming part of Letters Patent No. 684,657, dated October 15, 1901.

Application filed December 7, 1900. Serial No. 39,095. (No model.)

*To all whom it may concern:*

Be it known that I, FRANK GARDINIER WEBB, residing in the borough of Brooklyn, city and State of New York, have invented an Improvement in Gearing for Self-Moving Vehicles, of which the following is a specification.

The object of this invention is to provide a mechanism through which the power to drive the vehicle is conveyed from the engine to the axle and wheels of the running-gear and at the same time be capable of adjusting itself to the action of the springs that carry the body on the running-gear.

The accompanying drawings, forming part of this specification, show the invention, in which—

Figure 1 is an elevation. Fig. 2 is an enlargement of portion through line 2 2. Fig. 3 is an enlargement of G. Fig. 4 is a section through line 4 4.

Like letters refer to like parts.

In Fig. 1 the wheels, axle, springs, and body of the vehicle are shown, with the machinery for driving.

A is the axle of the driving-wheels.

B is the body of the vehicle.

S S are springs supporting the body on the axles.

F is a frame supporting and connecting the axle and the driving-gear. On the body B is fixed an engine E, driving the bevel-wheel E', which meshes into bevel-wheel $E^2$. $E^2$ is supported and has its bearing in $E^3$ from body B.

C is a shaft, a portion of which is squared or splined and fitted into a corresponding opening in bevel-wheel $E^2$, so as to move in the direction of its length in $E^2$. At the lower end of C is a boss with forked arms D, connected by links $D^2$ to similar forked arms D', the terminal portions of D and D' being spherical and the links having corresponding spherical cavities. The forked arm D' is connected by shaft C' to gimbal G and by shaft through bearing in F to bevel gear-wheel H, which gears into wheel H' on axle A. The action of this mechanism is to adjust itself to the varying distances between the body and the running-gear by the free action of the links up and down on the arms D and D' for the ordinary effect of inequalities of the roadway and by the sliding of shaft C in the gear $E^2$ when more movement is necessary. The action of the gimbal G is to allow for the swinging of the body on the running-gear in every direction from the perpendicular, while the power is conveyed through it and the other mechanism from the engine to the axles and wheels.

Having described my invention, what I desire to secure by Letters Patent is—

1. In a driving-gear for self-moving vehicles, the combination of the driving gear-wheel $E^2$, the shaft C arranged to slide in the wheel, the arms D, D fixed to shaft C, links $D^2$, $D^2$ connecting arms D, D to arms D', D' on shaft C'; combined to act for greater or lesser action of springs S, S, substantially as shown and described.

2. In a driving-gear for self-moving vehicles, the combination of the upright shafts C and C', the fixed arms D, D on shaft C and D', D' on shaft C', the arms being connected by links that are free to move in any direction on the arms, substantially as shown for the purpose described.

FRANK G. WEBB.

Witnesses:
T. W. WARNKE,
J. K. MAISCH.